United States Patent
Menachem et al.

(10) Patent No.: US 10,430,374 B2
(45) Date of Patent: Oct. 1, 2019

(54) SELECTIVE ACKNOWLEDGEMENT OF RDMA PACKETS

(71) Applicant: Mellanox Technologies Ltd., Yokneam (IL)

(72) Inventors: Adi Menachem, Hod Hasharon (IL); Ariel Shahar, Jerusalem (IL); Noam Bloch, Bat Shlomo (IL); Diego Crupnicoff, Buenos Aires (AR); Michael Kagan, Zichron Yaakov (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 164 days.

(21) Appl. No.: 15/196,088

(22) Filed: Jun. 29, 2016

(65) Prior Publication Data

US 2018/0004705 A1    Jan. 4, 2018

(51) Int. Cl.
| | |
|---|---|
| *G06F 15/173* | (2006.01) |
| *H04L 29/06* | (2006.01) |
| *G06F 13/28* | (2006.01) |
| *H04L 1/16* | (2006.01) |
| *H04L 1/18* | (2006.01) |

(52) U.S. Cl.
CPC ........ *G06F 15/17331* (2013.01); *G06F 13/28* (2013.01); *H04L 1/1614* (2013.01); *H04L 1/1635* (2013.01); *H04L 1/1809* (2013.01); *H04L 69/16* (2013.01)

(58) Field of Classification Search
CPC .. G06F 15/17331; H04L 69/16; H04L 5/0055
See application file for complete search history.

(56) References Cited

U.S. PATENT DOCUMENTS

| | | | | |
|---|---|---|---|---|
| 9,197,428 | B1* | 11/2015 | Lebedev | G06Q 40/04 |
| 2005/0149817 | A1* | 7/2005 | Biran | H03M 13/00 |
| | | | | 714/758 |
| 2006/0133554 | A1* | 6/2006 | Horn | H04W 56/001 |
| | | | | 375/354 |
| 2006/0274748 | A1* | 12/2006 | Nakashima | H04L 1/1835 |
| | | | | 370/389 |
| 2008/0225842 | A1* | 9/2008 | Goldfein | H04L 1/1825 |
| | | | | 370/389 |

(Continued)

OTHER PUBLICATIONS

InfiniBandTM Architecture Specification vol. 1, Release 1.3, 1842 pages, Mar. 3, 2015.

(Continued)

*Primary Examiner* — Michael A Keller
(74) *Attorney, Agent, or Firm* — Kligler & Associates (57) ABSTRACT

A method for data transfer includes transmitting a sequence of data packets, including at least a first packet and a second packet transmitted subsequently to the first packet, from a first computer over a network to a second computer in a single remote direct memory access (RDMA) data transfer transaction. Upon receipt of the second packet at the second computer without previously having received the first packet, a negative acknowledgment (NAK) packet is sent from the second computer over the network to the first computer, indicating that the first packet was not received. In response to the NAK packet, the first packet is retransmitted from the first computer to the second computer without retransmitting the second packet.

9 Claims, 5 Drawing Sheets

(56) References Cited

U.S. PATENT DOCUMENTS

| | | | | |
|---|---|---|---|---|
| 2010/0231352 | A1* | 9/2010 | Bolton | G06F 13/387 340/5.8 |
| 2011/0078291 | A1* | 3/2011 | Bickson | G06F 11/3409 709/221 |
| 2012/0093136 | A1* | 4/2012 | Julian | H04W 88/08 370/336 |
| 2012/0240000 | A1* | 9/2012 | Venkataraj | H04L 1/1657 714/751 |
| 2012/0314648 | A1* | 12/2012 | Zhang | H04L 1/1848 370/328 |
| 2013/0024578 | A1* | 1/2013 | Lida | H04L 12/2832 709/227 |
| 2013/0031215 | A1* | 1/2013 | Macrae | H04L 12/1868 709/219 |
| 2013/0230051 | A1* | 9/2013 | Lockwood | H04L 1/22 370/394 |
| 2014/0040616 | A1* | 2/2014 | Barber | G06F 11/1453 713/168 |
| 2014/0254598 | A1* | 9/2014 | Jha | H04L 45/74 370/392 |
| 2014/0269360 | A1* | 9/2014 | Jafarian | H04W 52/0209 370/252 |
| 2014/0334375 | A1* | 11/2014 | Sugitani | H04W 84/20 370/315 |
| 2015/0046533 | A1* | 2/2015 | Talloen | H04M 3/567 709/204 |
| 2015/0085720 | A1* | 3/2015 | Gaal | H04L 1/1854 370/280 |
| 2015/0103822 | A1* | 4/2015 | Gianchandani | H04L 69/08 370/389 |
| 2015/0117201 | A1* | 4/2015 | Cousins | H04L 43/0852 370/235 |
| 2015/0121161 | A1* | 4/2015 | Cousins | H04L 1/1858 714/749 |
| 2015/0146607 | A1* | 5/2015 | Abraham | H04L 1/1685 370/312 |
| 2015/0172226 | A1 | 6/2015 | Borshteen et al. | |
| 2015/0222444 | A1* | 8/2015 | Sarkar | H04L 12/1877 370/390 |
| 2015/0295692 | A1* | 10/2015 | Gowda | H04L 5/0055 370/336 |
| 2015/0381323 | A1* | 12/2015 | Ammirata | H04L 43/087 370/516 |
| 2016/0062442 | A1* | 3/2016 | Burstein | G06F 1/3209 713/320 |
| 2016/0085704 | A1* | 3/2016 | Lida | H04N 21/4305 710/106 |
| 2017/0201343 | A1* | 7/2017 | Merlin | H04L 1/0007 |

OTHER PUBLICATIONS

Mathis et al., "TCP Selective Acknowledgment Options", Network Working Group, RFC2018, 12 pages, Oct. 1996.

* cited by examiner

SELECTIVE ACKNOWLEDGEMENT OF RDMA PACKETS

FIELD OF THE INVENTION

The present invention relates generally to computer systems, and particularly to data exchange over a network among computers by remote direct memory access (RDMA).

BACKGROUND

Some packet transport protocols, such as the Transmission Control Protocol (TCP), use a mechanism of acknowledgment (ACK) and retransmission to ensure that messages are delivered reliably in their entirety. The receiver of packets on a TCP connection sends ACK packets back to the transmitter to indicate which data packets it has received. When the transmitter fails to receive a positive acknowledgment within a certain timeout period, it retransmits the unacknowledged packet or packets.

A selective acknowledgment (SACK) mechanism for TCP was defined by Mathis et al., in "TCP Selective Acknowledgment Options," published as Request for Comments (RFC) 2018 by the Internet Engineering Task Force (IETF), October, 1996. According to the authors, with selective acknowledgments, the data receiver can inform the sender about all segments that have arrived successfully, so the sender need retransmit only the segments that have actually been lost.

RDMA protocols enable the network interface controller (NIC) of one computer to read and write data over a network from and to the memory of another computer without involving the operating system of either computer in the memory access operations. These RDMA operations are typically performed in response to work requests submitted to the NIC by application processes running on the host processor, and thus enable applications on different nodes of the network to exchange data efficiently, with high bandwidth and low latency. A number of RDMA protocols are known in the art, such as the InfiniBand™ (IB) RDMA protocols that are used over IB switch fabrics, and RDMA over Converged Ethernet (RoCE), which is designed to run over Ethernet networks. In RoCE, the IB RDMA layer runs directly over the Ethernet link layer (in RoCE version 1) or over the User Datagram Protocol (UDP) transport layer on Internet Protocol (IP) networks (in RoCE version 2).

SUMMARY

Embodiments of the present invention that are described hereinbelow provide methods and apparatus that facilitate efficient RDMA data transfer.

There is therefore provided, in accordance with an embodiment of the invention, a method for data transfer, which includes transmitting a sequence of data packets, including at least a first packet and a second packet transmitted subsequently to the first packet, from a first computer over a network to a second computer in a single remote direct memory access (RDMA) data transfer transaction. Upon receipt of the second packet at the second computer without previously having received the first packet, a negative acknowledgment (NAK) packet is sent from the second computer over the network to the first computer, indicating that the first packet was not received. In response to the NAK packet, the first packet is retransmitted from the first computer to the second computer without retransmitting the second packet.

In some embodiments, the RDMA data transfer transaction includes an RDMA write operation, in which the first computer is the requester and the second computer is the responder. In some of these embodiments, transmitting the sequence of the data packets includes, after retransmitting the first packet, completing the RDMA write operation by transmitting at least a third packet subsequent to the second packet in the sequence from the first computer to the second computer. Typically, completing the RDMA write operation includes transmitting, after receiving the retransmitted first packet at the second computer, a positive acknowledgment (ACK) packet from the second computer to the first computer identifying a most recent packet in the sequence that was received at the second computer prior to receiving the retransmitted first packet, and resuming transmission of the sequence at a point following the identified most recent packet.

In other embodiments, the RDMA data transfer transaction includes an RDMA read operation, in which the first computer is the responder and the second computer is the requester. In one of these embodiments, retransmitting the first packet includes transmitting from the second computer to the first computer, after receipt of the second packet at the second computer, a further RDMA read request to the first computer identifying a data segment that was contained in a payload of the first packet for retransmission by the first computer in a further RDMA read response.

In a disclosed embodiment, sending the NAK packet includes identifying in the NAK packet a plurality of the packets in the sequence, including the first packet, that were not received at the second computer, and retransmitting the first packet includes retransmitting the plurality of the packets.

Additionally or alternatively, sending the NAK packet includes identifying in the NAK packet both the first packet that was not received and the second packet that was received at the second computer. In one embodiment, the NAK packet contains a bitmap, including bits corresponding respectively to the packets in the sequence and having respective bit values set to indicate whether or not each of the corresponding packets was received at the second computer.

In a disclosed embodiment, the RDMA data transfer transaction is performed in accordance with a predefined RDMA protocol that does not support selective acknowledgment, wherein the NAK packet is sent in a format specified by the predefined RDMA protocol, while modifying one or more fields of the NAK packet so that a NIC that is adapted for selective acknowledgment will retransmit the first packet in response to the NAK packet without retransmitting the second packet.

There is also provided, in accordance with an embodiment of the invention, data transfer apparatus, including a first network interface controller (NIC), which couples a first computer to a network and is configured to transmit a sequence of data packets, including at least a first packet and a second packet transmitted subsequently to the first packet, over the network to a second computer in a single remote direct memory access (RDMA) data transfer transaction. A second NIC couples the second computer to the network and is configured to send, upon receipt of the second packet without previously having received the first packet, a negative acknowledgment (NAK) packet over the network to the first computer, indicating that the first packet was not received. The first NIC is configured to retransmit the first packet, in response to the NAK packet, to the second computer without retransmitting the second packet.

The present invention will be more fully understood from the following detailed description of the embodiments thereof, taken together with the drawings in which:

DETAILED DESCRIPTION OF EMBODIMENTS

Overview

Performance of RDMA operations can be sensitive to packet loss, and RDMA protocols such as the IB and RoCE protocols were therefore designed to run over networks that are generally lossless. (Typically, link-level flow control is used to guarantee lossless transmission in both IB and Converged Ethernet networks.) For this reason, the mechanisms for acknowledgment of packet receipt and for retransmission in case of data loss in these RDMA protocols are simple: Upon failure to receive a positive acknowledgment, the transmitter retransmits all packets starting immediately after the last packet that was acknowledged by the receiver. In other words, loss of a single packet can result in duplicate transmission of many subsequent packets. In lossless networks, this inefficiency is inconsequential, but when significant numbers of loss events occur, the RDMA retransmission approach can have a negative effect on performance.

Embodiments of the present invention that are described hereinbelow provide mechanisms for selective acknowledgment and retransmission of RDMA packets, which substantially reduce the number of packets that have to be retransmitted in case of packet loss. These mechanisms are implemented autonomously by NICs that couple the participating host computers to the network and carry out the transactions, so that the host processors and operating systems are not involved in or even aware of the retransmissions. The disclosed mechanisms reduce the load on the network due to retransmissions and enable more rapid recovery from packet loss.

In the disclosed embodiments, a first NIC, which couples a first computer to a network, transmits a sequence of data packets over the network to a second NIC, coupled to a second computer, in an RDMA data transfer transaction. The transaction may be, for example, an RDMA write transaction, in which the first NIC initiates the transaction as the requester. If the second NIC receives a given packet in the sequence without first having received all of the other preceding packets in the sequence, the second NIC sends a negative acknowledgment (NAK) packet over the network to the first NIC, indicating the specific packet or packets that were not received. Upon receiving this NAK packet, the first NIC will then retransmit the packet or packets indicated in the NAK packet, without retransmitting the given packet and other later packets in the sequence that the second NIC did not report as lost.

Thus, the first NIC will typically transmit only those packets that the second NIC did not receive, so that the retransmission consumes no more bandwidth than is actually necessary. The second NIC holds the received packets in a memory buffer (which may be in the NIC, or a part of the host memory, or in any other available memory resource) until the retransmitted packets are received, as well, thus completing the data transfer transaction. The second NIC can then rearrange the data from the packet payloads in the proper, original order, for delivery to the process on the second computer to which the transaction was directed.

Furthermore, in some embodiments, the second NIC that detects the packet loss sends the NAK packet in a format specified by the standard, predefined RDMA protocol that is used in the network, even when this protocol was not originally designed to support selective acknowledgment. The NAK packet content is modified, as described hereinbelow, to contain selective retransmission instructions, so that as long as the first NIC supports this modified operation, the first NIC will transmit only the packets specified in the NAK packet. At the same time, legacy NICs, operating in accordance with the predefined, unmodified RDMA protocol, will retransmit, in response to the NAK packet, all of the packets in the transaction starting from the first packet whose receipt was not acknowledged, in the conventional manner.

System Description

Figure 1:
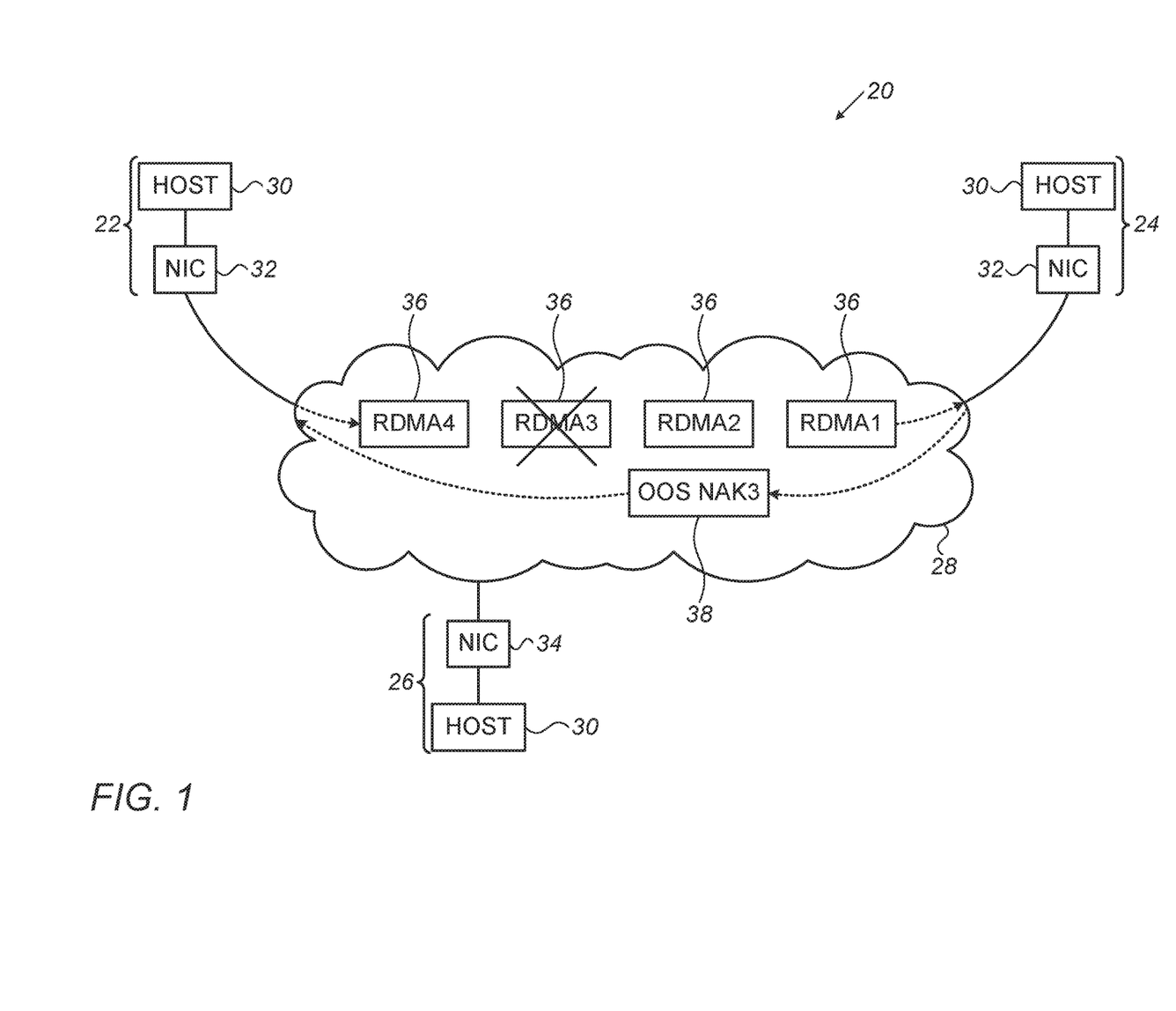
FIG. 1 is block diagram that schematically illustrates a computer system, in accordance with an embodiment of the invention.

FIG. 1 is block diagram that schematically illustrates a computer system 20, in which host computers 22, 24, 26 communicate via a packet network 28, in accordance with an embodiment of the invention. Each computer 22, 24, 26 comprises a host processing subsystem 30, comprising a host processor and memory, and is coupled to network 28 by a respective NIC 32 or 34. For purposes of the description that follows, NICs 32 are assumed to support selective retransmission, as described herein, while NIC 34 is a legacy device that does not provide selective retransmission support. In the present embodiment, network 28 is assumed to be an Ethernet network, over which NICs 32, 34 exchange data using the RoCE protocol, but the principles of the present invention are equally applicable to RDMA operations carried out over other types of networks and/or using other RDMA protocols.

In the example shown in FIG. 1, NIC 32 of computer 22 sends a sequence of data packets 36 over network 28 to NIC 32 of computer 24 in an RDMA data transfer transaction. The third packet 36 in the sequence, identified in the figures as "RDMA3," is lost in transit due, for example, to congestion encountered at a switch in network 28. Consequently, NIC 32 of computer 24 receives the next packet in the sequence, labeled "RDMA4," without having previously received RDMA3. (This same sort of eventuality may also occur when RDMA4 arrives at its destination before RDMA3 due to a routing delay, for example.)

After receiving packet RDMA4 at computer 24 without previously having received RDMA3, NIC 32 of computer 24 sends an out-of-sequence (OOS) NAK packet 38 over network 28 to computer 22, indicating that it did not receive packet RDMA3. NIC 32 may send NAK packet 38 immediately upon receiving packet RDMA4, or it may wait until a certain timeout has elapsed. In this latter case, NAK packet 38 may identify multiple packets 36 in the sequence (including packet RDMA3) that were not received at computer 24. In either case, NIC 32 of computer 22 will respond by retransmitting the packet or packets indicated by NAK packet 38, without retransmitting packet RDMA4 or other packets that were not explicitly requested by NIC 32 of computer 24. Additionally or alternatively, NAK packet 38 may identify both packet RDMA3 (and possibly other packets) as not having been received and packet RDMA4 (or another packet) as the last packet 36 in the sequence that was received at computer 24. These sorts of multi-function NAK and ACK/NAK packets are helpful in optimizing the use of network bandwidth and host memory by NICs 32.

Figure 6:
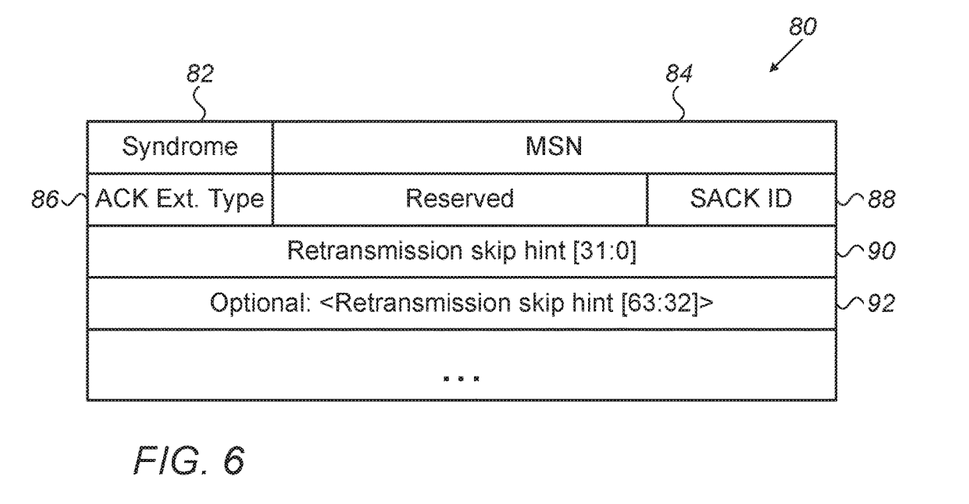
FIG. 6 is a block diagram that schematically illustrates a selective ACK packet, in accordance with an embodiment of the invention.

NAK packet 38 can be sent in a standard ACK format that is provided by the IB transport protocol or in an extended format, such as that shown in FIG. 6. In the former case, assuming legacy NIC 34 of computer 26 (rather than NIC 32 of computer 22) transmitted the sequence of packets 36 to NIC 32 of computer 24, NAK packet 38 will appear to NIC 34 to be a standard RoCE acknowledgment message, indicating that packet RDMA3 was not received. NIC 34 will then retransmit the entire sequence of packets, including both RDMA3 and RDMA4, in accordance with the conventional practice. Assuming NIC 32 of computer 24 has stored packet RDMA4 in a local memory buffer, it will simply discard either the duplicate RDMA4 packet that is retransmitted or the previous, stored RDMA4 packet before delivering the data to the host processor. Some bandwidth will therefore be wasted, but full interoperability of all NICs 32, 34 is maintained.

Figure 2:
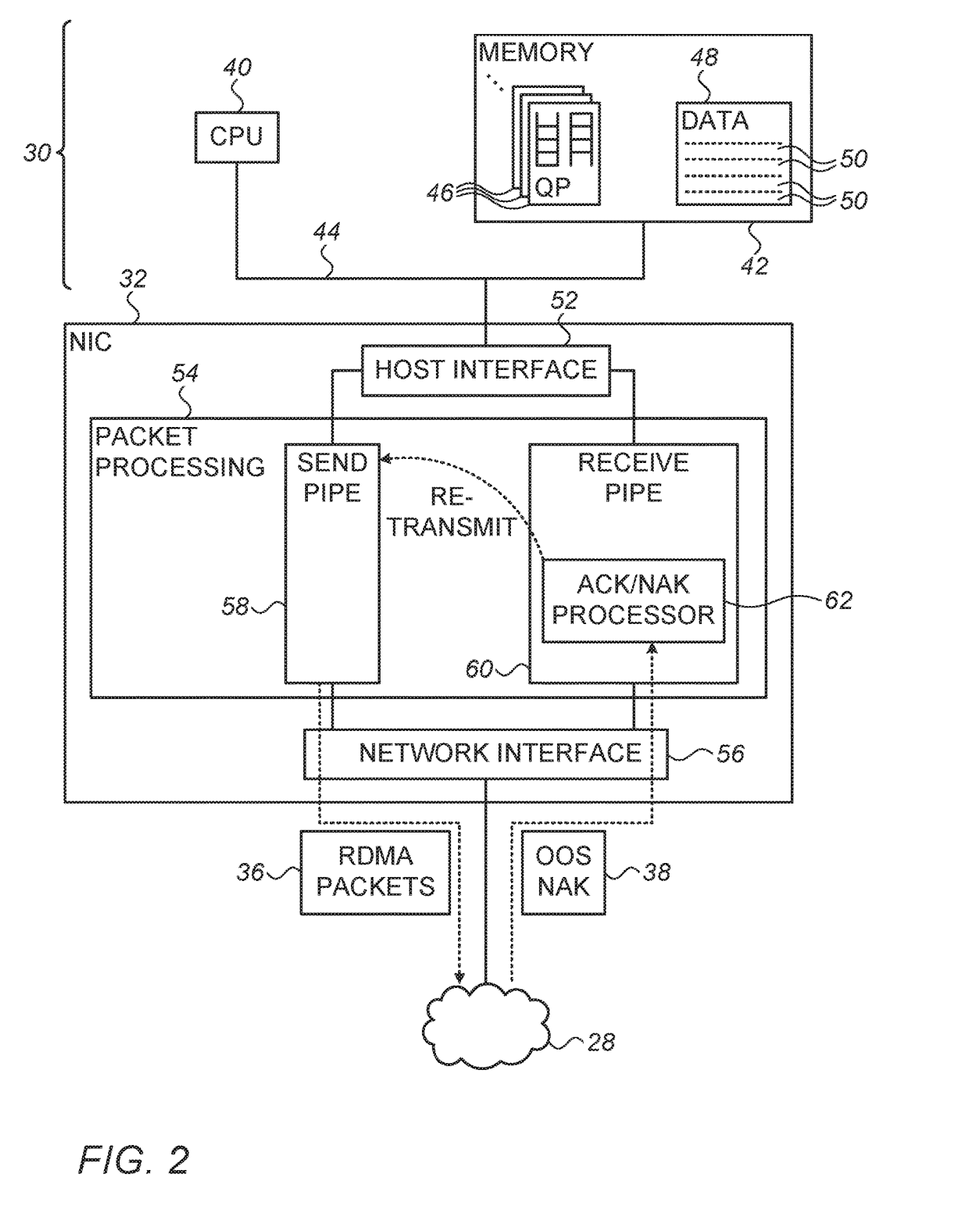
FIG. 2 is a block diagram that schematically shows details of a host computer with a network interface controller (NIC), in accordance with an embodiment of the invention.

FIG. 2 is a block diagram that schematically shows details of host computer 22, and particularly NIC 32, in accordance with an embodiment of the invention. Typically, host computer 24 and its NIC 32 are of similar structure and functionality to that shown in FIG. 2. Host processing subsystem 30 comprises a host processor 40, typically comprising at least one central processing unit (CPU), and a system memory 42, linked by a peripheral component bus 44, such as a PCI Express® (PCIe) bus, to NIC 32. Processes running in software on host processor 40 interact with NIC 32 by submitting work requests to NIC driver software, which places corresponding work items, known as work queue elements (WQEs), into work queues 46 in memory 42. Typically, the work queues are arranged as queue pairs (QPs), each including a send queue and a receive queue.

To initiate an RDMA transaction, such as an RDMA write or read operation to or from computer 24, host processor 40 posts a WQE in the appropriate work queue 46 and notifies NIC 32 that the WQE is awaiting execution. The WQE identifies a data buffer 48 in memory 42 from which the RDMA data are to be read by NIC 32 for transmission to computer 24 or to which the data are to be written by NIC 32 upon receipt from computer 24. When the transaction involves a large amount of data, NIC 32 will carry out the transaction by sending or receiving multiple data packets, each with a respective segment 50 of the data in buffer 48 as its payload.

NIC 32 comprises a host interface 52, which connects to bus 44, and a network interface 56, with one or more ports connecting to network 28. Packet processing logic 54, coupled between host interface 52 and network interface 56, reads and executes WQEs from work queues 46, typically by direct memory access (DMA) via bus 44. A send pipe 58 generates and transmits data packets via network interface 56 to network 28 in accordance with the instructions provided by the WQEs. For example, in the case of an RDMA write request, send pipe 58 will generate one or a sequence of RDMA data packets 36, each containing its respective segment 50 of data, read by DMA from buffer 48.

A receive pipe 60 in packet processing logic 54 receives and processes data packets from network 28. In the case of incoming RDMA write or RDMA read response packets, receive pipe 60 will write the data segments contained in the packet payloads to the appropriate locations in buffer 48. When packets in a sequence are received out of order, receive pipe 60 can still write segments 50 to buffer 48 in the proper, ordered locations, but will refrain from reporting to host processor 40 that the transaction has been completed until all packets in the sequence have actually been received. (Techniques that can be used in this context for handling out-of-order RDMA packets and transactions are described, for example, in U.S. Patent Application Publication 2015/0172226, whose disclosure is incorporated herein by reference.)

Receive pipe 60 tracks packet reception, and in particular verifies that sequences of packets received in RDMA data transfer transactions arrive in order. As long as the packets are received in order, an acknowledgment engine 62, in or associated with receive pipe 60, generates ACK packets identifying the last packet that was received, and instructs send pipe 58 to send these ACK packets to the transmitting computer. On the other hand, upon receipt of a packet with a given sequence number in an RDMA transaction without previously having received all of the packets in the transaction with preceding sequence numbers, acknowledgment engine 62 will recognize the occurrence of an OOS event. The acknowledgment engine will then instruct send pipe 58 to send a corresponding NAK packet 38 to the transmitting computer, identifying the missing packet or packets. Example scenarios of this sort are illustrated in the figures that follow. NAK packet 38 may be sent immediately, or alternatively, transmission of the NAK packet may be delayed temporarily while awaiting possible arrival of the missing packet or packets (and canceled if the packet or packets do arrive).

When an incoming NAK packet 38 is received by network interface 56, acknowledgment engine 62 parses the NAK packet in order to identify the packet or packets that were lost in transmission to computer 24, and thus the corresponding segments 50 that will require retransmission. Acknowledgment engine 62 passes a retransmission instruction to send pipe 58, causing the send pipe to read the appropriate data from buffer 48 and retransmit the requested RDMA data packets 36. Upon receiving the retransmitted packets, the RDMA transaction can be completed.

Methods of Operation

Figure 3:
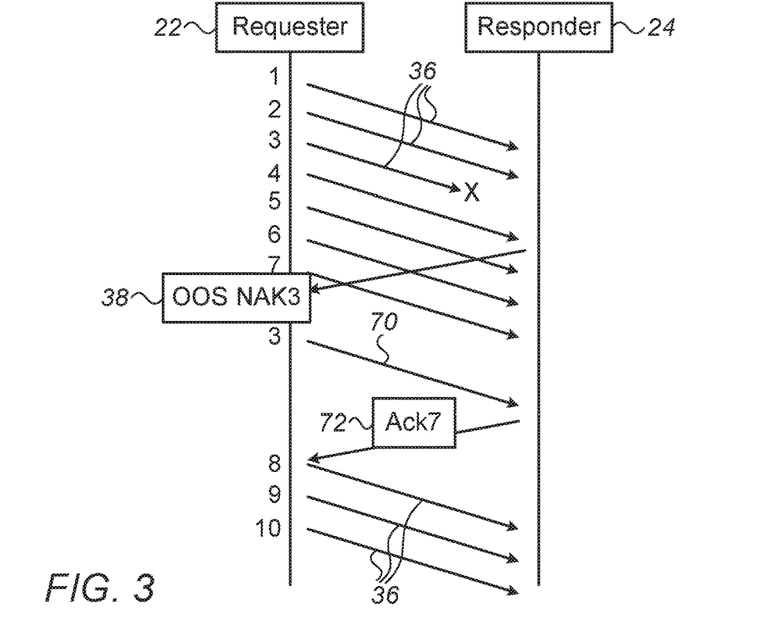
FIGS. 3-5 are ladder diagrams that schematically illustrate methods for selective acknowledgment and retransmission of RDMA write packets, in accordance with embodiments of the invention.

FIG. 3 is a ladder diagram that schematically illustrates a method for selective acknowledgment and retransmission of RDMA write packets, in accordance with an embodiment of the invention. In this description (and in FIGS. 4 and 5), for the sake of concreteness and clarity, computer 22 is assumed to be the requester, which transmits the RDMA data packets in the RDMA write operation, while computer 24 is the responder, which receives and acknowledges the packets. Alternatively, the roles of the two computers may be reversed in this transaction, or other computers with suitably-configured NICs 32 may be involved.

NIC 32 of computer 22 transmits data packets 36 in the sequence that is shown in FIG. 3, but the NIC of computer 24 receives packet #4 before receiving packet #3 (which may arrive later or not at all). As NIC 32 of computer 22 is not yet aware that any packet failed to reach its destination in the proper sequence, the NIC continues transmission of packets 36 following packet #3.

Upon receiving packet #4, NIC 32 of computer 24 sends NAK packet 38 back to computer 22, indicating that packet #3 was not received. In the meanwhile, NIC 32 of computer 24 continues to receive the additional packets 36 in the sequence that were transmitted by the NIC of computer 22 and stores the data from these packets in memory 42 of computer 24. Upon receiving NAK packet 38, NIC 32 of computer 22 suspends transmission of further data packets 36, and responds to NAK packet 38 by generating and sending a retransmitted data packet 70. This retransmitted data packet is typically labeled with the same packet serial number (PSN) as the packet identified in NAK packet 38, i.e., #3 in the present example. Packet 70 is transmitted out of order, without retransmission of the subsequent packets 36 that were successfully received at computer 24.

After receiving retransmitted data packet 70, NIC 32 of computer 24 arranges the received packet data in memory 42, and returns a positive ACK packet 72 over network 28 to computer 22. ACK packet 72 typically identifies the most recent packet in the sequence that was successfully received at computer 24 prior to receiving retransmitted packet 70. Thus, in the present example, packet 72 acknowledges data packet #7. Upon receiving this ACK packet 72, NIC 32 of computer 22 resumes transmission of the sequence of data packets 36 at a point following this identified most recent packet, i.e., at packet #8. NIC 32 of computer 22 goes on to complete the RDMA write operation by transmitting further packets to computer 24 until the entire sequence has been transmitted and acknowledged.

Figure 4:
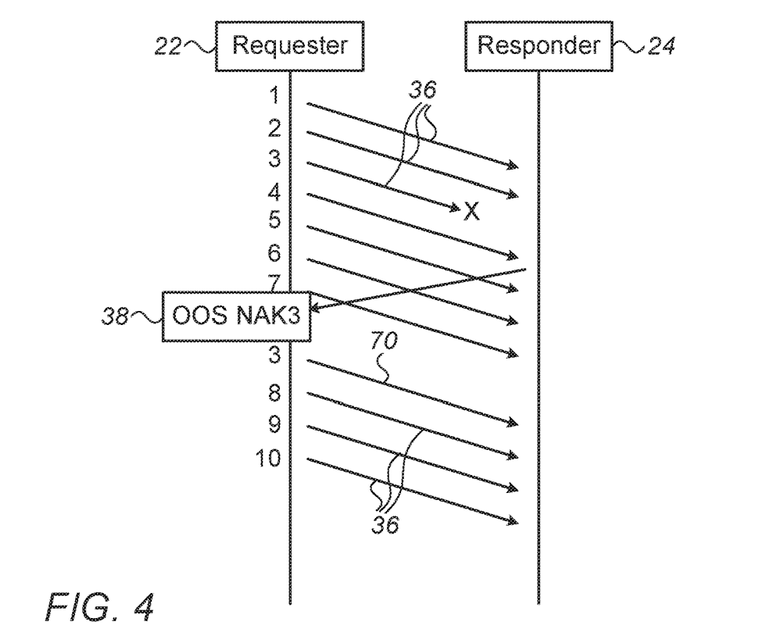

FIG. 4 is a ladder diagram that schematically illustrates a method for selective acknowledgment and retransmission of RDMA write packets, in accordance with an alternative embodiment of the invention. This embodiment operates similarly to the embodiment of FIG. 3, except that after receiving NAK packet 38 and sending retransmitted data packet 70, NIC 32 of computer 22 does not wait for any additional acknowledgment, but rather continues immediately with the transmission of the remaining data packets 36 in the sequence.

Figure 5:
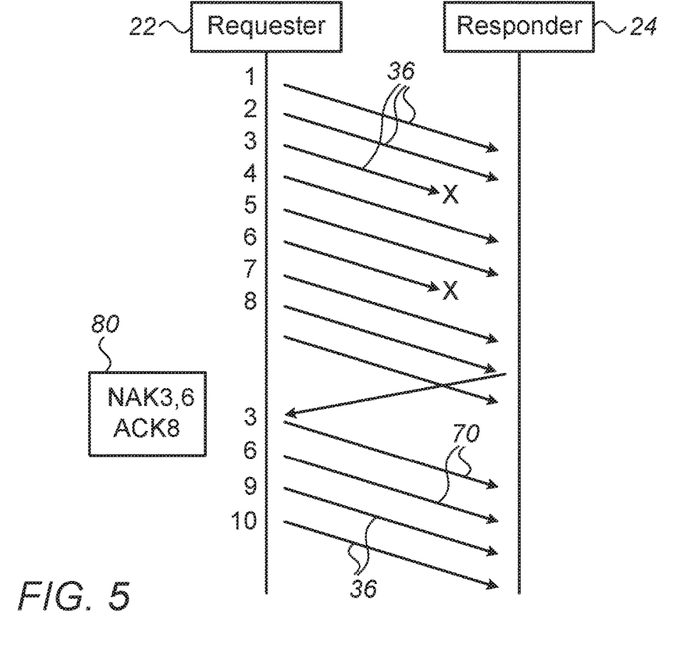

FIG. 5 is a ladder diagram that schematically illustrates a method for selective acknowledgment and retransmission of RDMA write packets, in accordance with yet another embodiment of the invention. In this example, two of data packets 36 in the RDMA write sequence from computer 22 to computer 24—packets #3 and #6—are lost in transit through network 28. In this case, however, NIC 32 of computer 24 does not send a NAK immediately, but rather waits for a certain timeout period before sending a combined NAK packet 80. (In the meanwhile, NIC 32 saves the payloads of the packets that it did successfully receive in a buffer for subsequent reordering and delivery to the host processor.)

Combined NAK packet 80 identifies, in this case, multiple packets in the sequence, including both of packets #3 and #6, that were not received at computer 24. Alternatively, combined NAK packet 80 may specify how many packets 36 need to be retransmitted or a range of packet serial numbers for retransmission. Further alternatively or additionally, combined NAK packet 80 can identify not only the packet or packets that were not received, but also one or more packets that NIC 32 of computer 24 did receive, for example, the last packet 36 that was received before the timeout— packet #8 in this example. NIC 32 of computer 22 will then retransmit two packets 70, corresponding to the original packets #3 and #6, and will then resume transmission at the next packet 36 in the original sequence.

FIG. 6 is a block diagram that schematically illustrates a selective ACK packet 80, which can be used, for example, in the scenario shown above in FIG. 5, in accordance with an embodiment of the invention. This packet format is based on the ACK extended transport header (AETH) that is defined in section 9.3.5 of the *InfiniBand Architecture Specification* (Volume 1, Release 1.3, 2015), published by the InfiniBand Trade Association. Use of this extended ACK format is subject to negotiation between the participating NICs at the time of connection setup (and legacy NICs will continue to use the standard ACK format without selective acknowledgment).

The ACK/NAK-related part of packet 80 begins with a syndrome 82 and a message serial number (MSN) 84, as defined by the *InfiniBand Architecture Specification*. MSN 84 is a monotonically-increasing (modulo 224) sequence number of the last message completed at the responder (computer 24 in the preceding examples), which is used to optimize completion processing at the requester. The remaining fields, are defined as follows:

ACK Extension type 86—Set to the value 1, to indicate that this is a selective ACK.

SACK ID 88—An 8-bit number, identifying this selective ACK. Each new SACK ID sent by the responder indicates to the requester that SACK retransmission hints 90, 92 that follow in this packet 80 represent the updated state of the retransmission window.

The responder updates SACK ID 88 upon identifying a new lost packet, requiring retransmission, with a serial number outside the retransmission range that was identified previously:

SACK_ID=(received_packet_psn<previous$_{13}$ received_psn && not_smallest_ hole)?SACK_ID+1: SACK_ID The requester (computer 22) can use the SACK ID to begin a retransmission flow whenever the latest SACK ID does not equal the previous SACK ID, or when the requester receives information from the responder regarding new retransmissions that are required.

Retransmission skip hints 90, 92 contain a bitmap, comprising bits corresponding respectively to packets 36 in the sequence. The bit values in the bitmap are set to indicate whether or not each of the corresponding packets was received at the responder (computer 24). Thus, the bitmap in hints 90, 92 indicates which packets preceding the packet indicated by MSN 84 need not be retransmitted. In this example, a given bit is set to 0 to indicate to the requester that the corresponding packet should be retransmitted, and 1 to indicate that retransmission is not required. Bit 0 corresponds to the packet indicated by MSN 84 and is always set to 1.

Thus, by transmitting packet 80, the responder is able to indicate to the requestor which packet numbers should and should not be retransmitted. Setting a bit in the bitmap to 1 indicates that the responder received and was able to store the packet data (in some cases even if the packet was received out of order), although it does not necessarily guarantee that the packet passed all necessary checks. The requester can then skip retransmission of packets 36 for which it received a retransmission skip hint from the responder (i.e., the corresponding bit in hint 90 or 92 was set to 1) and for which it is not awaiting a response. Later packets, for which hints 90 do not exist, are transmitted (or retransmitted) normally. The requester continues to update its tracking of packet receipt even while receiving retransmitted packets 70, and sends new selective ACK packets 80 accordingly.

Alternatively, other acknowledgment packet formats may be used in conveying selecting acknowledgment information from the responder to the requester. In some embodiments, for example, the selective ACK comprises only syndrome 82 and MSN 84 (without the additional fields 86, 88, 90 and 92 that are shown in FIG. 6), but the values of the syndrome and MSN fields are modified to convey selective ACK information. As in the case of the packet format shown in FIG. 6, the use of these modified field values is subject to negotiation between the requester and the responder at the time of connection setup.

In one such embodiment, syndrome 82 is assigned a special value to indicate that this ACK packet is an OOS NAK, while the value of MSN 84 indicates the number of consecutive packets that the requester is to retransmit. Thus, for instance, if the PSN indicated by the ACK packet header is #3 (as in the previous example), and MSN 84 contains the value "4", the requester will retransmit packets #3, #4, #5 and #6. If necessary, the responder can transmit multiple OOS NAKs of this sort in order to invoke retransmission of multiple non-contiguous sequences of one or more packets.

Alternatively, when the non-contiguous sequences are close together (for example, packets #3-#6, followed by packets #8-#10), the responder may simply request retransmission of all the packets in both or all the sequences by setting MSN 84 to the size of the range from the first packet in the first sequence to the last packet in the last sequence. The responder will then simply discard the duplicate packets that it receives. This approach can be useful in reducing communication overhead.

Figure 7:
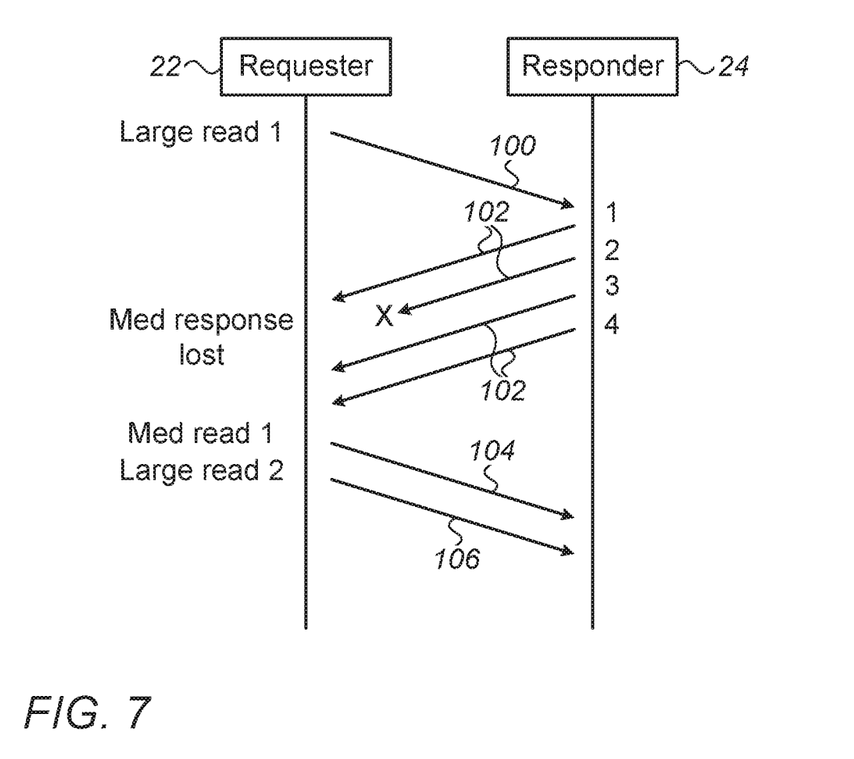
FIG. 7 is a ladder diagram that schematically illustrates a method for selective retransmission of RDMA read packets, in accordance with an embodiment of the invention.

FIG. 7 is a ladder diagram that schematically illustrates a method for selective retransmission of RDMA read packets, in accordance with another embodiment of the invention. In the pictured scenario, NIC 32 of computer 22 is again the requester, but in this case NIC submits an RDMA read request 100 to computer 24, the responder. The read request is labeled in the figure as "large" in the sense that NIC 32 of computer 24 is required to send many RDMA read response packets 102 to convey the requested data to computer 22. One of these packets 102— packet #2 in the pictured example— is lost in network 28 and fails to reach computer 22.

After discovering the loss of packet #2, NIC 32 of computer 22 transmits a further RDMA read request 104 to computer 24, identifying the data segment that was contained in the payload of the lost packet and thus requesting that NIC 32 of computer 24 retransmit the data in a further RDMA read response. Read request 104 is identified in FIG. 7 as a "medium read," since it asks for retransmission of only a limited part—packet #2 in the pictured example—of the data requested in the previous RDMA read request 100. To generate read request 104, NIC 32 of computer 22 keeps a record of read response packets 102 that it has and has not received. This record is functionally equivalent to the retransmission skip hints 90, 92 provided by selective ACK packet 80 (FIG. 6), in indicating to the NIC those packets for which retransmission should be requested and those for which retransmission can be skipped.

After transmission of "medium" RDMA read request 104, NIC 32 of computer 22 returns to normal operation, for example with transmission of another "large" RDMA read request 106.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for data transfer, comprising:
   transmitting from a requesting computer over a network to a responding computer a first remote direct memory access (RDMA) read request, thereby causing the responding computer to transmit over the network a first RDMA response comprising data arranged in respective payloads of a sequence of data packets, including at least a first packet and a second packet transmitted subsequently to the first packet, the first and second packets respectively containing first and second segments of the data; and
   upon receipt of the second packet without previously having received the first packet at the requesting computer, transmitting a second RDMA read request from the requesting computer over the network to the responding computer, the second RDMA read request identifying the first segment of the data for retransmission by the responding computer in a second RDMA read response without requesting retransmission of the second segment.

2. The method according to claim 1, and comprising keeping a record at the requesting computer of the data packets that were received by the requesting computer in response to the first RDMA read request, wherein transmitting the second RDMA read request comprises sending the second RDMA read request with respect only to the data packets that the record indicates were not received at the requesting computer.

3. The method according to claim 1, wherein the requesting and responding computers are coupled to the network by respective first and second network interface controllers (NICs), and
   wherein the first RDMA read request is transmitted by the first NIC in response to an RDMA work queue element (WQE) submitted to the NIC by a host processor of the requesting computer, and
   wherein the method comprises reporting from the first NIC to the host processor that the RDMA WQE has been completed only after receiving the second RDMA read response.

4. The method according to claim 3, and comprising rearranging in a memory of the requesting computer, by the first NIC, the first and second segments of the data received respectively from the first and second RDMA read responses in an order in which the first and second segments were originally transmitted in the first RDMA read response.

5. The method according to claim 3, wherein the first NIC submits the second RDMA read request only with respect to the data in the data packets of the first RDMA response that were not received by the first NIC.

6. A data transfer apparatus, comprising:
a host interface, for connection to a bus of a host computer, which includes a host processor and a system memory;
a network interface, comprising one or more ports for connection to a packet network; and
packet processing logic, which is coupled between the host interface and the network interface and is configured to transmit a first remote direct memory access (RDMA) read request over a network to a responding computer, thereby causing the responding computer to transmit over the network a first RDMA response comprising data arranged in respective payloads of a sequence of data packets, including at least a first packet and a second packet transmitted subsequently to the first packet, the first and second packets respectively containing first and second segments of the data,
wherein the packet processing logic is configured, upon receipt of the second packet from the network without previously having received the first packet via the network interface, to transmit a second RDMA read request over the network to the receiving computer, the second RDMA read request identifying the first segment of the data for retransmission by the responding computer in a second RDMA read response without requesting retransmission of the second segment.

7. The apparatus according to claim 6, wherein the packet processing logic is configured to keep a record of the data packets that were received from the network in response to the first RDMA read request, and to send the second RDMA read request with respect only to the data packets that the record indicates were not received.

8. The apparatus according to claim 6, wherein the packet processing logic is configured to transmit the first RDMA read request in response to an RDMA work queue element (WQE) submitted to the NIC by the host processor, and
wherein the packet processing logic is configured to report to the host processor that the RDMA WQE has been completed only after receiving the second RDMA read response.

9. The method according to claim 6, wherein the packet processing logic is configured to rearrange the first and second segments of the data that were received respectively from the first and second RDMA read responses in the system memory in an order in which the first and second segments were originally transmitted in the first RDMA read response.

* * * * *